UNITED STATES PATENT OFFICE.

MAXIMILIAN JULIUS SCHREITER, OF HAMBURG, GERMANY.

PROCESS OF REFINING CAMPHOR.

SPECIFICATION forming part of Letters Patent No. 390,523, dated October 2, 1888.

Application filed June 15, 1888. Serial No. 277,252. (No specimens.)

*To all whom it may concern:*

Be it known that I, MAXIMILIAN JULIUS SCHREITER, a subject of the Emperor of Germany, and a resident of Hamburg, Germany, have invented certain new and useful Improvements in Processes of Refining Camphor, of which the following is a specification.

In the process formerly employed camphor has been refined by direct sublimation, or by distillation followed by sublimation. In comparison with these processes the hereinafter-described process has the advantage of great simplicity and absolute freedom from danger.

In carrying out my invention I make use of camphor oils exported in large quantities from China and Japan, obtained in these countries as by-products in the manufacture of crude camphor, and which serve as an excellent dissolvent for the crude camphor still containing water and other impurities. These raw or refined camphor-oils, or certain products of the fractional distillation of them, can dissolve, when heated, about three times their own weight of the raw camphor, while cold they only dissolve sixty per cent., so that from a warm saturated solution the camphor is separated in the form of very fine crystals after the solution is considerably cooled. Therefore, the camphor-oil is heated in an alembic or other vessel with a condensing-head leading the volatilized oils back and then saturated with crude camphor. In case this solution should appear to be of yellowish color, animal charcoal for bleaching and long fibrous asbestos or cellulose are added, by which means the animal charcoal itself and other organic or inorganic substances mixed with the crude camphor are easily separated. The solution thus prepared is forced through a filter-press and thence conducted to closed vessels, wherein the filtered solution is cooled correspondingly slower or faster to obtain crystals of any desired size. These crystals, to which camphor-oil is still adherent, are finally separated by centrifugal force under the addition of water partly impregnated with camphor-oil. The oil floating on the surface of the centrifugated water is taken off and used again in the above-described refining process. The camphor retained in the centrifugal machine appears as a very fine crystalline white powder, which is dried entirely at about 40° to 50° Celsius.

Having now particularly described and ascertained the nature of my invention and in what manner the same has to be performed, I declare that what I claim is—

The process of rectifying camphor by dissolving the same in the presence of heat in camphor-oil in such proportions that the camphor is separated in the form of very fine crystals, filtering the solution by means of animal charcoal, asbestos, or cellulose, and then separating the remaining crystals by centrifugal force, substantially as and in the manner set forth.

In testimony that I claim the foregoing as my invention I have signed my name, in presence of two witnesses, this 24th day of April, 1888.

MAXIMILIAN JULIUS SCHREITER.

Witnesses:
  ALEXANDER SPECHT,
  G. MÉGINNISS.